3,084,188
PROCESS FOR RECOVERING WATER-SOLUBLE GLUCOHEPTONIC ACID SALTS
Herman Horn and Howard C. Klein, Brooklyn, N.Y., and Richard Griffith, Middletown, N.J., assignors to Nopco Chemical Company, Harrison, N.J., a corporation of New Jersey
No Drawing. Filed Sept. 22, 1959, Ser. No. 841,462
8 Claims. (Cl. 260—528)

The present invention relates to the preparation of salts of sugar acids. More particularly, the present invention relates to a process for recovering salts of glucoheptonic acid having improved physical and chemical characteristics.

Salts of glucoheptonic acid have been prepared by introducing a nitrile substituent into d-glucose and hydrolyzing the nitrile. For example, glucose is reacted with a solution of calcium cyanide under alkaline conditions. The reaction is mildly exothermic and the calcium salt is directly recovered from the one-step reaction (see U.S. Patent No. 2,735,866).

Salts of glucoheptonic acid such as the sodium and potassium salts are known to have sequestering properties [see Mehltretter et al., Ind. Eng. Chem. 45: 2782 (1953)], and as a result of such properties these salts are useful in washing preparations for the washing of glassware and the like. However, when it is desired to prepare commercially the sodium and potassium salts which are useful as sequestering agents, extreme difficulties have been encountered. For example, when sodium glucoheptonate is prepared on a large scale, it is usually obtained as a dark red brown hygroscopic material having a sequestering power of about 20 to 25 grams of calcium per 100 grams of product. The difficulty involved in obtaining these salts has been found to lie primarily in the recovery procedures. After the reaction in aqueous solution between d-glucose and the cyanide salt it is necessary to separate the salt from its aqueous medium as well as from impurities present therein. Attempts to crystallize the sodium salt from solution have been tried; however this is exceedingly slow and the yields are low. When atmospheric and vacuum roll drying have been carried out upon the sodium salt, the resulting product was a dark red brown flaky material. When the sodium salt was recovered by spray drying a concentrated aqueous solution thereof, a lighter colored product was obtained; however, it caked in the equipment and to recover the caked salt it was then necessary to chop it out of the equipment. Likewise, in attempts to recover the salt after evaporating its aqueous solution to dryness, it was also found necessary to chop out the product since it formed a hard cake in the vessel.

Accordingly, it is an object of the present invention to recover in an improved form salts of glucoheptonic acid.

It is a further object of the present invention to recover salts of glucoheptonic acid in improved yields and purity and characterized by having a light color, improved sequestering power and reduced hygroscopicity.

It is a still further object to recover salts of glucoheptonic acid in an improved manner thereby obviating the difficulties previously encountered in prior art recovery procedures as well as to obviate need for equipment such as spray, roll and vacuum driers and the like.

Further objects will become apparent from the detailed description given hereinafter. It is intended, however, that the detailed description and specific examples do not limit the invention, but merely indicate the preferred embodiments of the invention since various changes and modifications within the scope of the invention will become apparent to those skilled in the art.

The above and other objects have been unexpectedly achieved in the following manner. We have found that when an aqueous solution of a salt of glucoheptonic acid is treated with a water-miscible organic solvent, either before or after crystallization, the resulting precipitated product has been found to be of improved color and purity, have decreased hygroscopicity and improved sequestering power, e.g., of the order of 30 to 33 grams of calcium per 100 grams of salt. Also the yields were found to be very good, i.e., from 85% to over 90% of theory. Moreover, as a result of this procedure, the product can be easily ground to a fine powder. There is no need for chopping a hardened cake out of the equipment since none is ever formed. Neither is there any need to use the spray driers, roll driers, vacuum driers, and the like.

We have discovered that to bring about these unexpected and superior results, a critical relationship exists between the concentration of the glucoheptonic acid salt in aqueous solution and in the quantity of water-miscible organic solvent which is introduced therein. The aqueous solution should contain between about 55% to about 75% by weight of the glucoheptonic acid salt when the water-miscible organic solvent is added. The amount of water-miscible organic solvent which is added to the solution of the salt amounts to about 0.25 to about 0.80 ml. per gram of the salt present in the aqueous solution. We prefer, however, to employ a range of from about 0.25 ml. to about 0.55 ml. per gram of salt present in the aqueous solution since when the concentration of the salt in the aqueous solution approaches its upper limit, the larger quantities of solvent introduce handling difficulties. We have found that when the amount of organic solvent is reduced or when the amount of the water in the salt solution is increased, then although a product of good color is obtained, the yields are exceedingly poor. Likewise, when the amount of water in the aqueous solution is reduced or the quantity of organic solvent is increased, not only is a darkened product obtained but it is characterized by being gummy and difficult to collect. Thus, our discovered relationship between the concentration of glucoheptonic acid salt in its aqueous solution and the amount of water-miscible organic organic solvent added thereto has been found to be critical.

Useful water-miscible organic solvents are methanol, ethanol, isopropanol, acetone, ethylene glycol, dimethyl formamide, etc., as well as mixtures thereof. These solvents are merely exemplary since other solvents can be used so long as they have the requisite property of being water-miscible. As stated previously, the water-miscible solvent can be introduced to the salt solution, prior to or subsequent to the crystallization of the glucoheptonic acid salt. The solvent can also be introduced, if desired, after partial crystallization has occurred.

It has also been found that as a result of our process the residual amount of cyanide salt in the final product is reduced when compared with procedures such as spray drying, roll drying, evaporation to dryness etc. This is believed due to the fact that when the salt is precipitated according to our process, the cyanide salt remains in solution. However, we also prefer, when reacting the cyanide salt with glucose to employ a 5% excess of glucose over cyanide salt. This also contributes to reduction of cyanide salt in the final product.

As stated before, the preparation of several of these salts has been reported. d-Glucose is reacted with an approximately stoichiometric amount of a cyanide salt, e.g., sodium, potassium, barium or calcium cyanide. In our process, a 5% molar excess of d-glucose is preferably used. The reaction is carried out in aqueous solution under an alkaline pH, e.g., from about 9 to 14 at temperatures of from about room temperature to 60° C. Room temperature is preferred since the reaction is exothermic. The amount of water present during the reaction is not critical, however, this quantity is adjusted if necessary so that there is from about 55% to about 75% of glucoheptonic acid salt based on the weight of the aqueous solution present when the crystallization is to be carried out. The adjustment of the salt concentration when the water content is in excess of that desired can be carried out by vacuum concentration, i.e., heating at temperatures of from 20° to 70° C. under 30 to 24 inches of vacuum. If the water content is less than that desired, then additional water can be added.

Whether crystallization is carried before or after introduction of the water-miscible solvent, it can be conveniently carried out at room temperature. The length of time needed for crystallization will vary depending upon the concentration and temperature of the solution. However, we prefer to allow from about one to five hours for crystallization. Preferably, crystallization is accompanied with stirring.

It is of course understood that the present process is not limited solely to the preparation of sodium and potassium glucoheptonates, which salts are useful as sequestering agents. The preparation of other water-soluble salts such as the barium and calcium glucoheptonates can also be advantageously carried out according to our process.

The following examples further illustrate our process and are not to be construed in a limiting manner.

Example I

This example demonstrates that when recovery of sodium gluconate is attempted by roll drying and spray drying, unsatisfactory results are obtained.

A. 16.8 lbs. of anhydrous d-glucose and 4.45 lbs. of 97% active sodium cyanide were dissolved in 132 lbs. of water at room temperature and thereafter stirred for one hour. The solution was then allowed to stand overnight. Thereafter, the solution was concentrated by distilling off a portion of the water under reduced pressure leaving behind 48 lbs. of a concentrated red solution. This solution contained 45.5% by weight of sodium glucoheptonate. A portion of this material was dried on steam heated rolls heated at 23 p.s.i. gauge pressure. The resulting product formed a taffy-like mass which set to a hard brown resinous material upon cooling. It had a moisture content of 1.47% by weight of the total.

B. Attempts to spray dry another portion of the above concentrated sodium glucoheptonate solution failed due to the adherence of the product to the chamber and collector walls of the spray drier.

Example II

This example demonstrates need for the addition of a water-miscible organic solvent since in its absence incomplete crystallization from water results.

38.2 grams of anhydrous d-glucose and 10.1 grams of 97% active sodium cyanide were dissolved in 38 ml. of water. The temperature rose spontaneously to 55° C. during the course of one hour. After cooling to room temperature, crystallization of sodium glucoheptonate started. After standing for three days at room temperature, the crystallized sodium glucoheptonate was filtered with some difficulty and dried at 55° C. The yield was 29.4 grams or 59% of theory. The product had a sequestering power of 27.4 grams of calcium per 100 grams of product. Prior to crystallization, the concentration of sodium glucopheptonate was 59% by weight of the solution containing same.

Example III

In this example only sufficient water was used to allow for hydrolysis of the nitrile.

A. 95.5 grams of anhydrous d-glucose and 25.2 grams of sodium cyanide were aded to a solution of 150 ml. of methanol and 36 ml. of water. Gradual solution of the glucose and sodium cyanide occurred which was followed by precipitation of sodium glucoheptonate in about 20 minutes. After one hour, a gummy mass separated from the solution.

B. The procedure of part A was repeated except that only 14 ml. of water were used. The results were similar except that the gummy mass was harder.

C. The procedure of part A was again repeated except that no water was introduced during the first half-hour of reaction between d-glucose and sodium cyanide. Then, small quantities of water were added as follows: 1 ml. after the first one-half hour, 3.5 ml. were added one-half hour later and finally 4.5 ml. were added after an additional half-hour. The suspension gradually thickened and turned yellow. It was allowed to stand overnight during which time a hard yellow crystalline agglomerate was formed. This solid material was separated from the solution and dried for 4 hours at 55° C. In this manner, 106 grams of a black resin was obtained.

Example IV 26.5 lbs. of d-glucose and 6.5 lbs. of sodium cyanide were dissolved in 198 lbs. of water and stirred overnight at room temperature. The resulting reaction mass was concentrated to 56 lbs. at a bath temperature of 65° C. to 68° C. and 29.6 inches of vacuum. The amount of sodium glucoheptonate in the concentrated solution was 57% by weight of the total. The material was stirred for 1.5 hours at room temperature until some crystallization had occurred. Then 17 lbs. of methanol were slowly added, i.e., 0.53 ml. per gram of sodium glucoheptonate. Precipitation slowly occurred. The precipitated sodium glucoheptonate was filtered and dried. In this manner, 28.6 lbs. of salt were obtained having a moisture content of 11.47% and a purity of 100% on a dry basis. The percent yield was 80%.

Example V 191 grams of anhydrous d-glucose and 50.5 grams of 97% of sodium cyanide were dissolved in 135 ml. of water. The temperature during reaction was kept below 40° C. by cooling with an ice bath. The solution was then allowed to cool down to room temperature and stirred overnight at room temperature. The resulting sodium glucoheptonate amounted to 68% by weight of the solution. 125 ml. of methanol, i.e., 0.5 ml. per gram of salt were introduced into the solution and the solution stirred for one hour and filtered. In this manner, there was obtained 200.4 grams of sodium glucopheptonate which was 81% of theory. The product had a moisture content of 5.98%, sequestering power of 30.4 grams of calcium per 100 grams of product on a dry basis and a purity of 98.0% on a dry basis.

Example VI

A solution containing 104 grams of 92% active d-glucose (which is 92% d-glucose and 8% water), 25.2 grams of sodium cyanide and 501 ml. of water was stirred for 20 hours at room temperature and then concentrated to 175 grams. The resulting sodium glucoheptonate was present in an amount of 71% by weight of the concentrated solution. The concentrated solution was then stirred for 1.5 hours at room temperature until crystallization occurred. Then 60 ml. of methanol, i.e., 0.48 ml. per gram of salt, were added to complete crystallization. In this manner, 120.2 grams of sodium glucoheptonate was obtained. The purity was 96.6% (as is) and the yield was 93% of theory on a dry basis. The product contained 3.86% moisture, and had a sequestering power of 32.2 grams of calcium per 100 grams of product on a dry basis.

Example VII

A solution containing 104 grams of 92% active d-glucose, 25.2 grams of sodium cyanide and 501 ml. of water was stirred for 20 hours at room temperature under slight vacuum to aid ammonia removal. Thereafter, the solution was concentrated to 170.8 grams. The resulting sodium glucoheptonate was present in an amount of 73% by weight of the concentrated solution. Then, 45 ml. of methanol, i.e., 0.36 ml. per gram of salt, were introduced to bring about precipitation of the sodium glucoheptonate. After filtering off and drying the precipitated material, there was obtained 119.9 grams of sodium glucoheptonate which was 89% of theory. The product had a moisture content of 7.2%, a purity of 93.6% (as is) and a sequestering power of 32.5 grams of calcium per 100 grams of product on a dry basis.

*Example VIII*

A solution containing 104 grams of 92% active d-glucose, 25.2 grams of sodium cyanide and 501 ml. of water was stirred for 20 hours at room temperature. A continuous stream of nitrogen was passed into the solution to carry off the ammonia formed during reaction. The solution was then concentrated to 175.6 grams. The resulting sodium glucoheptonate amounted to 71% by weight of the concentrated solution. This solution was stirred for two hours at room temperature and slowly diluted with 40 ml. of methanol, i.e., 0.32 ml. of methanol per gram of salt, stirred for an additional hour at room temperature and finally centrifuged. In this manner, pale yellow solids were obtained which were dried at 55° C. The yield amounted to 97.7 grams of sodium glucoheptonate which was 80% of theory. The product had a moisture content of 7.25%, a purity on a dry basis of 92.7% and a sequestering power of 30.8 grams of calcium per 100 grams of product on a dry basis.

*Example IX*

26 lbs. of anhydrous d-glucose and 6 lbs., 10 oz. of sodium cyanide were dissolved in a 154 lbs. of water at room temperature after which stirring was carried out overnight. In this manner a solution containing sodium glucoheptonate was obtained. The resulting solution was then concentrated at a bath temperature of 70° to 75° C. and 28.6 inches of vacuum until its weight was reduced to 56 lbs. The concentration of sodium glucoheptonate in this concentrated solution was 61.5% by weight based upon the weight of the solution. The concentrated solution was then stirred with cooling until most of the crystallization of the salt occurred. It was then diluted by slowly introducing 20 lbs. of methanol after which stirring was carried out overnight at room temperature. Finally, the material was filtered, dried and ground. In this manner, 29.5 lbs, of sodium glucoheptonate was obtained as a yellow crystalline powder. Upon analysis, the product contained 5.01% by weight of moisture and 10 p.p.m. of cyanide calculated as hydrogen cyanide. The purity of the product on a dry basis was 91.5%. The yield was 88% of theory. The sequestering powder was found to be 30.3 grams of calcium per 100 grams of product on a dry basis. The amount of methanol used herein amounted to 0.78 ml. per gram of the salt.

Having described our invention what we claim is new and desire to secure by Letters Patent is:

1. In a process of preparing water-soluble glucoheptonic acid salts selected from the group consisting of alkali and alkaline earth metal salts of said glucoheptonic acid by reacting together approximately equimolar quantities of d-glucose and a water-soluble cyanide salt in aqueous solution having an alkaline pH at temperatures between room temperature and 60° C., the combination therewith of adjusting the solution of the resulting salt of glucoheptonic acid to a concentration of between about 55% to 75% by weight of said solution and thereafter introducing into said adjusted solution a water-miscible organic solvent selected from the group consisting of methanol, ethanol and isopropanol in an amount of from about 0.25 ml. to about 0.80 ml. per gram of said salt of glucoheptonic acid.

2. The process of claim 1 in which said water-miscible organic solvent is introduced in amounts of from about 0.25 ml. to about 0.55 ml. per gram of said salt.

3. The process of claim 2 in which said organic solvent is methanol.

4. The process of claim 3 in which said cyanide salt is sodium cyanide and said salt of glucoheptonic acid is sodium glucoheptonate.

5. The process of claim 3 in which said cyanide salt is potassium cyanide and said salt of glucoheptonic acid is potassium glucoheptonate.

6. In a process of preparing water-soluble glucoheptonic acid salts selected from the group consisting of alkali and alkaline earth metal salts of said glucoheptonic acid by reacting together approximately equimolar quantities of d-glucose and a water-soluble cyanide salt in aqueous solution having an alkaline pH at temperatures between room temperature and 60° C., the combination therewith of adjusting the solution of the resulting salt of glucoheptonic acid to a concentration of between about 55% to 75% by weight of said solution, allowing said salt of glucoheptonic acid to slowly crystallize out of solution and thereafter introducing into the resulting crystallization mass a water-miscible organic solvent selected from the group consisting of methanol, ethanol and isopropanol in an amount of from about 0.25 to about 0.80 ml. per gram of said salt of glucoheptonic acid.

7. In a process of preparing water-soluble glucoheptonic acid salts selected from the group consisting of alkali and alkaline earth metal salts of said glucoheptonic acid by reacting together approximately equimolar quantities of d-glucose and a water-soluble cyanide salt in aqueous solution having an alkaline pH at temperatures between room temperature and 60° C., the combination therewith of adjusting the solution of the resulting salt of glucoheptonic acid to a concentration of between about 55% to 75% by weight of said solution and thereafter introducing into said adjusted solution a water-miscible organic solvent selected from the group consisting of methanol, ethanol and isopropanol in an amount of from about 0.25 ml. to about 0.80 ml. per gram of said salt of glucoheptonic acid and allowing said salt of glucoheptonic acid to slowly precipitate out of solution.

8. The process of claim 7 in which said water-miscible organic solvent is introduced in amounts of from about 0.25 ml. to about 0.55 ml. per gram of said salt.

References Cited in the file of this patent

UNITED STATES PATENTS

| | | |
|---|---|---|
| 2,606,918 | Isbell | Aug. 12, 1952 |
| 3,033,900 | Holstein | May 8, 1962 |

FOREIGN PATENTS

| | | |
|---|---|---|
| 385,973 | Great Britain | Dec. 28, 1932 |
| 538,548 | Great Britain | Aug. 7, 1941 |

OTHER REFERENCES

Philippe: Ann. Chim. et phys. (8) 26, 311–316 (1912).

Rupp et al.: Archiv der Pharmazie 251, 553–556 (1913).

Hudson et al.: J. Am. Chem. Soc. 56, 1248–1249 (1934).